(12) United States Patent
Buchanan et al.

(10) Patent No.: US 9,127,769 B2
(45) Date of Patent: *Sep. 8, 2015

(54) STABILIZED BACKING RING AND STABILIZING RING THEREFOR

(71) Applicant: The Timken Company, Canton, OH (US)

(72) Inventors: Alan D. Buchanan, Canton, OH (US); Stephen E. Brister, North Canton, OH (US); Jeffrey W. Schumacher, North Canton, OH (US)

(73) Assignee: The Timken Company, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/181,813

(22) Filed: Feb. 17, 2014

(65) Prior Publication Data

US 2014/0161381 A1  Jun. 12, 2014

Related U.S. Application Data

(63) Continuation-in-part of application No. PCT/US2012/048630, filed on Jul. 27, 2012.

(60) Provisional application No. 61/525,417, filed on Aug. 19, 2011.

(51) Int. Cl.
*F16C 33/72* (2006.01)
*F16J 15/32* (2006.01)
(Continued)

(52) U.S. Cl.
CPC .............. *F16J 15/32* (2013.01); *B61F 15/22* (2013.01); *F16C 33/768* (2013.01); *F16C 33/7886* (2013.01); *F16C 35/063* (2013.01)

(58) Field of Classification Search
CPC .......... B61F 15/12; B61F 15/26; B61F 15/22; F16C 33/768; F16C 78/7886; F16C 35/063
USPC ......... 384/459, 477, 542, 559, 597, 589, 618, 384/489
See application file for complete search history.

(56) References Cited

U.S. PATENT DOCUMENTS 2,851,315 A * 9/1958 Zavoda .......................... 384/486
2,950,002 A * 8/1960 Eastburg ....................... 206/318
(Continued)

OTHER PUBLICATIONS

International Search Report and Written Opinion for Application No. PCT/US2012/048630 dated Nov. 2, 2012 (4 pages).
(Continued)

*Primary Examiner* — Marcus Charles
(74) *Attorney, Agent, or Firm* — Michael Best & Friedrich LLP

(57) ABSTRACT

An axle has a journal to which an antifriction bearing is fitted on an enlarged or dust guard section located beyond the journal, with a fillet leading from the journal up to the enlarged section. A backing ring fits over and against the fillet of the journal and has a counterbore that receives the adjacent end of the enlarged section. A stabilizing ring fits into the counterbore of the backing ring and around the enlarged section of the journal to stabilize the backing ring and thereby reduce radial and circumferential movement between it and the fillet of the journal. The stabilizing ring includes a rigidifying element that fits over the enlarged section of the axle with an interference fit and a more flexible compression member that lies within the counterbore where it exists in a state of compression between the counterbore and the rigidifying element. The stabilizing ring allows some microaxial movement of the backing ring.

22 Claims, 6 Drawing Sheets

(51) Int. Cl.
*B61F 15/22* (2006.01)
*F16C 33/76* (2006.01)
*F16C 35/063* (2006.01)
*F16C 33/78* (2006.01)

(56) References Cited

U.S. PATENT DOCUMENTS

| | | | |
|---|---|---|---|
| 3,467,448 A | 9/1969 | Galle | |
| 4,422,698 A * | 12/1983 | Aoki et al. | 384/482 |
| 4,692,040 A * | 9/1987 | Ebaugh et al. | 384/477 |
| 4,764,035 A | 8/1988 | Boyd | |
| 5,213,343 A | 5/1993 | White, Jr. | |
| 5,257,432 A * | 11/1993 | Duke | 15/104.04 |
| 5,380,102 A | 1/1995 | Sink | |
| 5,549,395 A | 8/1996 | Sink | |
| 5,588,752 A | 12/1996 | Fetty | |
| 5,975,533 A | 11/1999 | Hubbard et al. | |
| 6,026,774 A | 2/2000 | Kajihara et al. | |
| 6,126,321 A | 10/2000 | Fetty et al. | |
| 6,312,161 B1 * | 11/2001 | Williams | 384/459 |
| 6,752,223 B2 | 6/2004 | Panigrahi et al. | |
| 7,219,938 B2 | 5/2007 | Brister | |
| 7,534,047 B2 | 5/2009 | Reed | |
| 7,563,050 B2 | 7/2009 | Strait | |
| 7,607,836 B2 | 10/2009 | Mason et al. | |
| 7,955,001 B2 | 6/2011 | Reed et al. | |
| 8,109,674 B2 | 2/2012 | Hubbard | |
| 8,113,126 B2 | 2/2012 | Forbes et al. | |
| 8,186,687 B2 | 5/2012 | Huang | |
| 8,226,299 B2 | 7/2012 | Hubbard et al. | |
| 8,317,202 B2 | 11/2012 | Rode et al. | |
| 8,356,941 B2 | 1/2013 | Mason et al. | |
| 8,356,945 B2 | 1/2013 | Mason et al. | |
| 8,360,651 B1 | 1/2013 | Fetty et al. | |
| 8,533,957 B2 | 9/2013 | Spurlock et al. | |
| 8,596,872 B2 | 12/2013 | Pruden | |
| 8,607,431 B2 | 12/2013 | Rode et al. | |
| 8,696,212 B2 | 4/2014 | Hubbard et al. | |
| 2005/0078897 A1 * | 4/2005 | Zhang | 384/476 |
| 2006/0012134 A1 | 1/2006 | Rode et al. | |
| 2006/0251352 A1 | 11/2006 | Reed | |
| 2008/0085069 A1 | 4/2008 | Toth | |
| 2008/0226212 A1 | 9/2008 | Mason et al. | |
| 2009/0258714 A1 | 10/2009 | Rode et al. | |
| 2010/0098369 A1 | 4/2010 | Reed et al. | |
| 2010/0272381 A1 | 10/2010 | Hubbard | |
| 2010/0322544 A1 | 12/2010 | Hubbard et al. | |
| 2011/0063447 A1 | 3/2011 | Hubbard | |
| 2011/0064347 A1 | 3/2011 | Hubbard et al. | |
| 2011/0085755 A1 | 4/2011 | Pruden | |
| 2011/0123142 A1 | 5/2011 | Mason et al. | |
| 2011/0216993 A1 | 9/2011 | Mason et al. | |
| 2012/0027330 A1 | 2/2012 | Fetty | |
| 2012/0082407 A1 | 4/2012 | Fetty | |
| 2012/0195540 A1 | 8/2012 | Hubbard et al. | |
| 2012/0263517 A1 | 10/2012 | Rode et al. | |
| 2012/0317814 A1 | 12/2012 | Spurlock et al. | |
| 2013/0230265 A1 | 9/2013 | Hubbard et al. | |

OTHER PUBLICATIONS

USPTO Office action dated Dec. 1, 2014 for U.S. Appl. No. 14/239,163, 20 pages.

Response to Dec. 1, 2014 Office action for U.S. Appl. No. 14/239,163, dated Dec. 8, 2014, 12 pages.

* cited by examiner

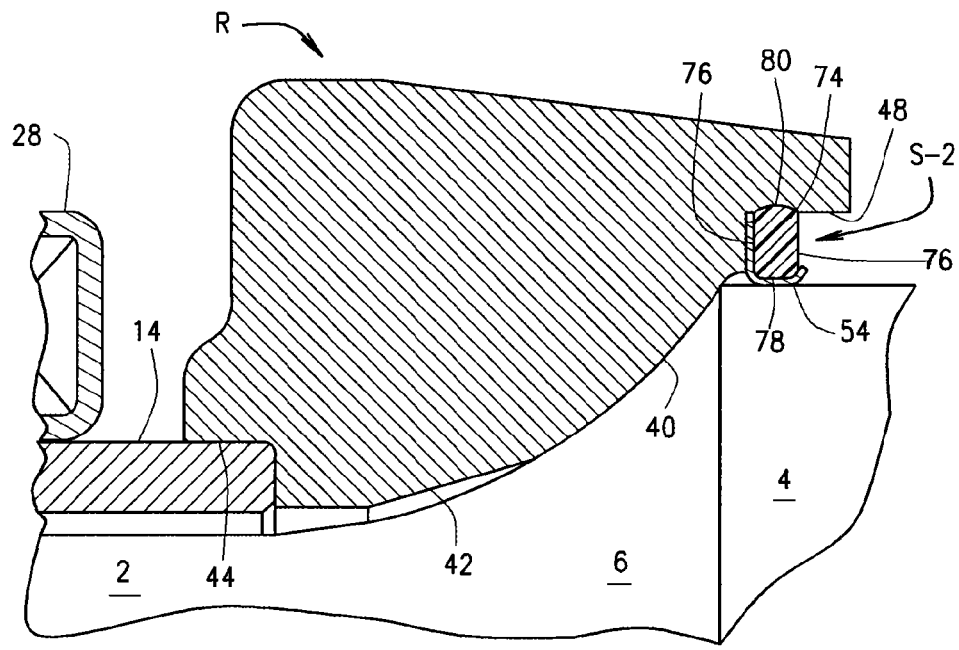
F I G. 4
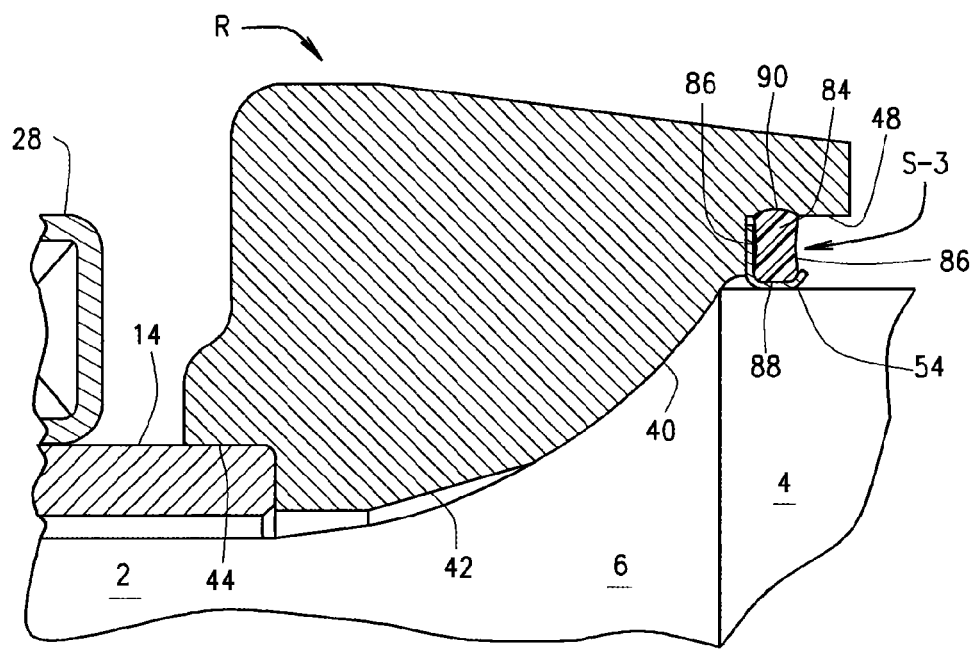
F I G. 5

STABILIZED BACKING RING AND STABILIZING RING THEREFOR

CROSS REFERENCE TO RELATED APPLICATIONS

This application is a continuation-in-part of International Application PCT/US2012/048630 filed Jul. 27, 2012, which derives priority from and otherwise claims the benefit of U.S. provisional application 61/525,417 filed 19 Aug. 2011, the entire contents of which are incorporated herein by reference.

BACKGROUND

The present invention relates in general to backing rings for bearings on shafts and, more particularly, to a stabilized backing ring that fits shafts of varying diameter, to an axle and bearing with which the backing ring is used, and to stabilizing rings for the backing ring.

The typical bearing for a railcar fits around a journal at the end of an axle where it is captured between a backing ring and an end cap. The backing ring seats against a fillet that merges into an enlarged dust guard section, while the end cap fits over the end of the journal to which it is secured with cap screws. On most journals seal wear rings fit between the bearing and the backing ring and also between the bearing and the end cap. Seals encircle the wear rings and exclude contaminants from the bearing. When tightened, the cap screws bear down against the end cap and clamp the bearing securely between the backing ring and end cap. This forces the backing ring snugly against the fillet.

The journals on any railcar axle represent the regions of least diameter in the axle, yet it is through these journals and nearby dust guard sections, which are somewhat larger, that the weight of the railcar is transferred to the wheels. Being subject to considerable weight, the journals flex cyclically as wheels roll along the rails of a railroad track, with most of the flexure occurring near the small ends of the fillets. The flexure produces movement between the backing rings and the fillets, and as a consequence both experience fretting and wear. When water seeps into the spaces between the backing rings and the fillets, it exacerbates the fretting with corrosion. The movement produces more wear where the seal wear rings that lie between the backing rings and the bearings abut races of the bearings. Sometimes the wear at a journal and wear ring is enough to eliminate the clamp fit that holds the bearing in place, and this disturbs the setting for the bearing, imparting more end play than desired.

To combat fretting wear and corrosion at axle fillets, bearing manufacturers introduced the fitted backing ring. It had a counterbore that snugly received the dust guard section adjacent to the fillet. Moreover, the American Association of Railroads (AAR) set standards for the fitted backing rings and further specified tolerances for the diameters of dust guard sections so that interference fits would exist between the dust guard sections and the counterbores of the backing rings. Thus, a fitted backing ring required the application of some force during the last increment of installation to overcome the interference fit. The interference fit stiffened the joint between the backing ring and the fillet on the journal and excluded moisture, thus reducing both fretting and corrosion between the backing ring and the journal. However, the AAR specified dust guard sections of larger diameter for the new axles, that is to say, dust guard diameters larger than those on older traditional axles. This enabled the new fitted backing rings to be used interchangeably with the older traditional axles and the new axles, but without interference fits on the older axles. In the absence of an interference fit, a fitted backing ring possesses little, if any, advantage over a more traditional backing ring without a counterbore for receiving the dust guard section. Moreover, fitted backing rings and likewise the dust guard sections over which they fit required additional machining to close tolerances, which increases the expense for manufacturing them.

In order to rigidify the new backing rings on old traditional axles, railroads began installing compressible stabilizing rings in the counterbores of so-called fitted backing rings and around the dust guard sections of the traditional axles. The typical stabilizing ring took the form of a stainless steel tube of circular configuration. It occupied the space between the lip on the backing ring and the dust guard section of the traditional axle in a state of compression and hence stabilized the backing ring over a fillet leading up to the dust guard section. See U.S. Pat. No. 7,219,938, FIGS. 1-3. Those stabilizing rings are difficult to form in a circular configuration and are otherwise expensive to manufacture.

SUMMARY

In one aspect, the invention provides shaft assembly having an axle, a journal to which a bearing is fitted, and an enlarged axle section with a fillet leading from the journal to the enlarged section; the shaft assembly including a backing ring located around the fillet and having a counterbore that receives an end of the enlarged section, and a stabilizing ring for reducing movement between the backing ring and the axle. The stabilizing ring includes a rigidifying element located around the enlarged section of the axle having an axially directed leg that fits over the enlarged axle section with an interference fit and a radially directed flange, and a compression member engaging the rigidifying element and a surface of the counterbore in the backing ring, the compression member being formed from a material that is more flexible than the material from which the rigidifying element is formed. The backing ring has a shoulder at an end of the counterbore, and the compression member is located between the flange and the shoulder of the counterbore.

In another aspect the invention provides a combination with an axle that defines an axis and has a journal and an enlarged section aligned with the journal and a fillet at which the journal leads up to the enlarged section and with a bearing including an inner race that fits over the journal and has a back face that is presented toward the fillet. The improvement includes a backing ring that fits over the journal between the fillet and the inner race of the bearing, the backing ring being against the fillet and having a lip that projects over the enlarged section and contains a counterbore that receives the enlarged section, and a stabilizing ring located within the counterbore of the backing ring between the lip of the backing ring and the enlarged section of the axle. The stabilizing ring includes a rigidifying element formed from a generally rigid material and having an axially directed leg fitted with an interference fit around the enlarged section of the axle and a radially directed flange and within the counterbore of the backing ring, and an annular compression member on the rigidifying element and engaging a surface of the counterbore in the backing ring, the compression member compressed between the lip of the backing ring and the axially directed leg of the rigidifying element, the compression member being formed from a material having a modulus of elasticity that is less than the modulus of elasticity for the material from which the rigidifying element is formed. The backing ring has a shoulder at an end of the counterbore, and the axially directed leg generally extends from a corner of the rigidifying element towards the shoulder of the backing ring.

In another aspect the invention provides a combination with a shaft assembly having an axle, a journal to which a bearing is fitted, and an enlarged axle section with a fillet leading from the journal to the enlarged section. The improvement includes a backing ring located around the fillet and having a counterbore that receives an end of the enlarged section adjacent to the fillet, and a stabilizing ring for reducing movement between the backing ring and the axle. The stabilizing ring includes a rigidifying element located around the enlarged section of the axle having an axially directed leg that fits over the enlarged axle section with an interference fit and a radially directed flange, and a compression member engaging the rigidifying element and a surface of the counterbore in the backing ring. The counterbore has a concave surface that is presented toward and surrounds the enlarged section of the shaft and a shoulder located at an end of the counterbore, and the compression member bears against the concave surface and the shoulder.

Other aspects of the invention will become apparent by consideration of the detailed description and accompanying drawings.

BRIEF DESCRIPTION OF THE DRAWINGS

FIG. 4 is an enlarged sectional view of an alternative stabilizing ring stabilizing a backing ring on the fillet of the journal.

FIG. 5 is a sectional view similar to FIGS. 2 and 4 and showing another alternative stabilizing ring.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
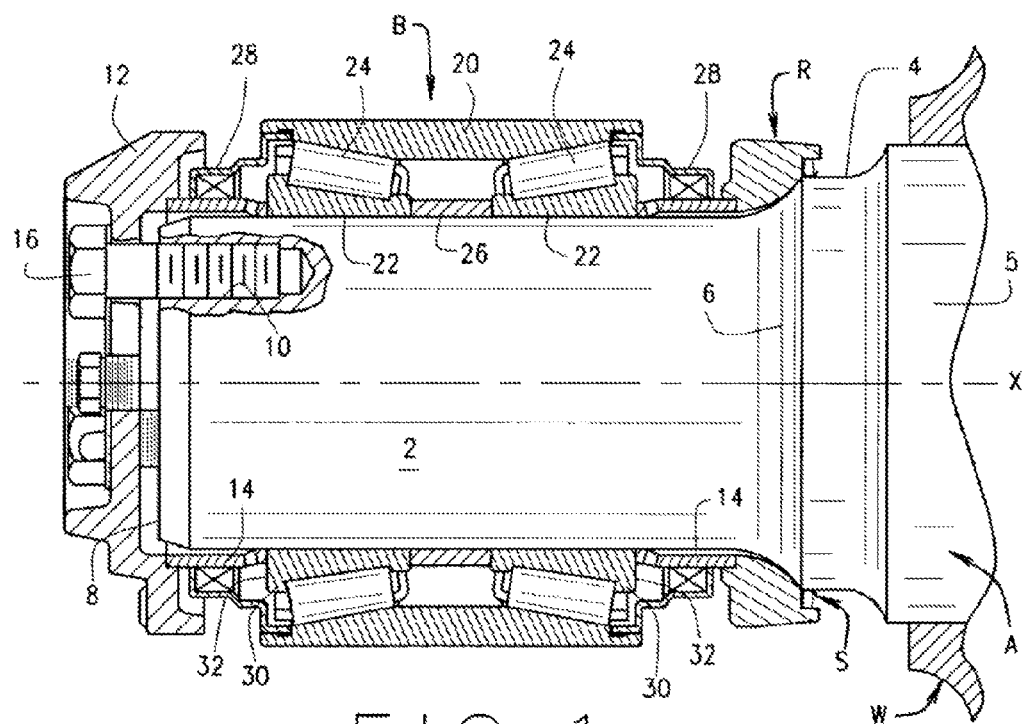
FIG. 1 is a longitudinal view of a journal on a railcar axle and a bearing located around the journal, with the journal behind the bearing being fitted with a backing ring and stabilizing ring constructed in accordance with and embodying the present invention.

Referring now to the drawings (FIG. 1), a railcar axle A, to which wheels W are fitted, rotates about an axis X as the wheels W roll along the rails of a railroad track. The axle A, along with several other like axles, supports a rail car, with the weight of the rail car being transferred to the axle through antifriction bearings B.

The axle A at each of its ends has a journal 2 which leads to an enlarged or dust guard section 4 at a fillet 6. Inwardly from the dust guard section 4 the axle A has an even larger wheel seat 5 to which a wheel W is fitted. The journal 2 extends out to an end face 8 out of which threaded holes 10 open. The journal 2, the dust guard section 4, and the wheel seat 5 are cylindrical and concentric, with their common center being the axis X.

The bearing B fits around the journal 2 where it is captured between a backing ring R that bears against the fillet 6 and an end cap 12 that extends over the end face 8, yet is spaced slightly outwardly from it. The bearing B is separated from the backing ring R and from the end cap 12 by wear rings 14, and all are clamped tightly together with cap screws 16 that thread into the holes 10 and bear against the end cap 16.

The bearing B includes an outer race in the form of a cup 20, an inner race in the form of two cones 22 located within the cup 20, and rolling elements in the form of tapered rollers 24 located between the cup 20 and cones 22. In addition, the bearing B includes a spacer 26 located between the two cones 22 to maintain a prescribed spacing between the cones 22 and thus control the setting of the bearing B. The ends of the bearing B are closed by seals 28 located between the ends of the cup 20 and the wear rings 14. The cones 22 fit over the journal 2 of the axle A with interference fits, with the spacer 26 being between them. The cup 20 fits into an adapter which in turn fits into the truck of a railcar. The tapered rollers 24 lie along tapered raceways on the cup 20 and cones 22 where they are organized in two rows—one around the inboard cone 22 and the other around the outboard cone 22. The raceways of the two cones 22 taper in opposite directions and so do the two raceways of the cup 20. This orients the rollers 24 such that the rollers 24 of the inboard row take thrust or axial loads in one direction, and the rollers 24 of the outboard row take thrust in the opposite direction. The rollers 24 of both rows transfer radial loads. At their ends the cones 22 have thrust ribs 30 which confine the rollers 24 to the annular space between the cup 20 and cones 22. The thrust rib 30 of each cone 22 leads out to a back face 32 that is squared off with respect to the axis X. The bearing B transfers thrust loads to the axle A primarily at the back faces 32 of its cones 22.

Actually, the thrust loads transferred through the inboard cone 22 pass to the axle A through the inboard wear ring 14 and the backing ring R which lie between the back face 32 of the inboard cone 22 and the fillet 6 on the journal 2. The thrust loads transferred through the outboard cone 22 pass to the axle A through the outboard wear ring 14, the end cap 12, and the cap screws 16. The end cap 12 fits over the end of the journal 2 and against the outboard wear ring 14 which in turn is against the back face 30 of the outboard cone 22. Indeed, the cap screws 16 clamp the two cones 22 and the spacer 26 and the wear rings 14 tightly between the backing ring R and the end cap 12 and maintain the backing ring R firmly against the fillet 6.

As the axle A revolves it will experience some flexure, with the greatest relative flexure occurring at each journal 2 in the region of the inboard wear ring 14 and at the back face of the inboard cone 22. Some relative flexure also occurs along the interface between the backing ring R and the fillet 6. The stabilizing ring S stabilizes the backing ring R and also inhibits the seepage of moisture along the fillet 6, thus reducing fretting corrosion between the fillet 6 and the backing ring R and simultaneously reducing relative motion between the back face 32 of the inboard cone 22 and the end of the inboard wear ring 14. In this regard, the backing ring R fits around the fillet 6 and further projects over the dust guard section 4. The stabilizing ring S fits between the backing ring R and the dust guard section 4 where the stabilizing ring S exists in a state of radial compression.

The backing ring R (FIG. 2) is preferably formed as a steel or iron casting or forging that is machined along critical surfaces. One of those surfaces is an arcuate inner surface 40 that is contoured to seat against the fillet 6 in the upper or larger regions of the fillet 6. The inner surface 40 tapers downwardly to a conical surface 42 which is spaced slightly away from the fillet 6, and the conical surface 42, in turn, leads out to a socket 44 that receives the end of the inboard wear ring 14 with an interference fit. The opposite end of the inboard wear ring 14 bears against the back face 32 of the inboard cone 22. The inboard wear ring 14, by reason of the clamping force exerted by the cap screws 16, bears firmly against the backing ring R at the end of the socket 44. At its opposite end the backing ring R has a lip 46 which projects axially beyond the arcuate inner surface 40 and over the adjacent region of the dust guard section 4 on the axle A, yet is spaced from the dust guard section 4. The lip 46 contains a counterbore 48 that at one end leads to a shoulder 50 and at its opposite end opens out of the lip 46. Preferably, the surface of the counterbore 48 is somewhat concave.

Figure 3:
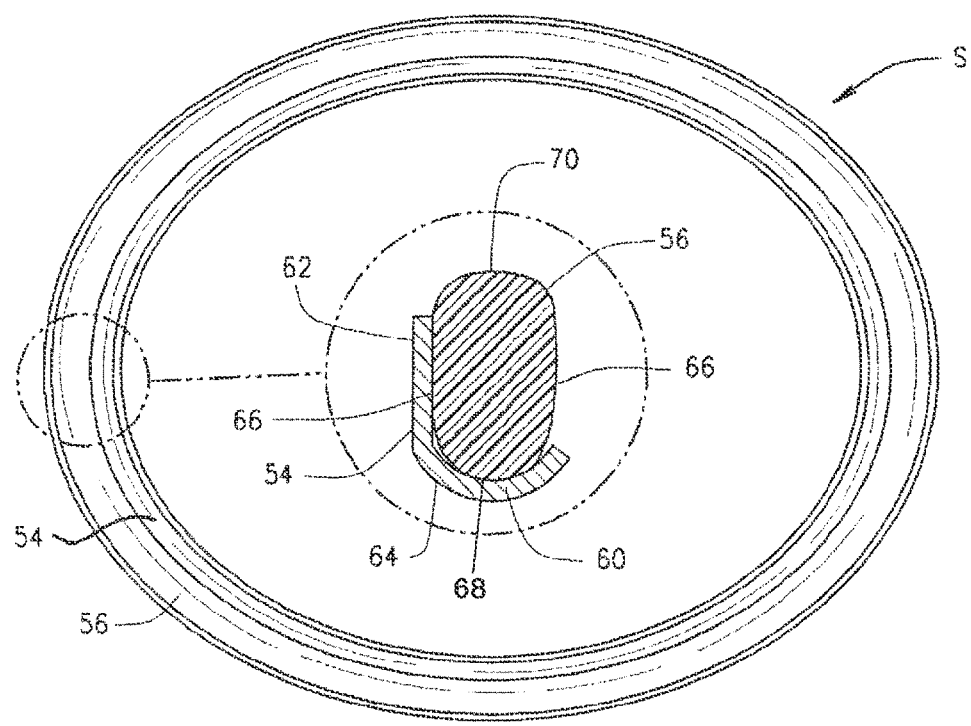
FIG. 3 is a perspective view of the stabilizing ring broken away and in section and detached from the axle and backing ring.

The stabilizing ring S fits within the counterbore 48 in the lip 46 of the backing ring R and around the dust guard section 4 to stabilize the backing ring R on the axle A against radial and circumferential movement relative to the axle A. The stabilizing ring S includes (FIG. 3) two components—a rigidifying element 54 and a compression member 56. Both are annular in configuration, with the element 54 generally being located within the member 56 to preserve the annular shape of the member 56. The rigidifying element 54 is formed from a rigid material such as a metal, preferably as a steel stamping. The compression member 56 is preferably formed from a polymer or similar material. The modulus of elasticity of that material, that is the Young's modulus, should range between about 90 psi (lbs/in$^2$) and about 420 psi. In an alternative embodiment, the Young's modulus should range between about 90 ksi (1000 lbs/in$^2$) and 1600 ksi. It should have a flexural strength of between approximately 1000 psi (lbs/in$^2$) and 12000 psi. Alternatively, the flexural strength may be between about 1000 psi and 35000 psi. Whatever the material, it is considerably more flexible than the material from which the rigidifying element 54 is formed. Thus, the modulus of elasticity for the material from which the compression member 56 is less—indeed, considerably less—than the material from which the rigidifying element 54 is formed.

The rigidifying element 54 as manufactured, that is to say when it is detached from the dust guard section 4, possesses a generally L-shaped verging toward a J-shaped configuration. As such it has (FIG. 3) an axially directed leg 60 and a radially directed flange 62, the two merging at a corner 64. The leg 60 possesses a slight bow, with its inside diameter at its smallest region being less than the diameter of the dust guard section 4. Thus the rigidifying element 54—and indeed, the stabilizing ring S—will fit over the dust guard section 4 with an interference fit. But even when so fitted, the axially direct leg 60 retains a slight bow.

The compression member 56, when not deflected, possesses (FIG. 3) a somewhat O-shaped or oblong configuration, it having convex side faces 66 that bulge outwardly, a convex inside face 68 that conforms generally to the profile in the axial leg 60 of the rigidifying element 54, and a convex outer face 70 that generally conforms to the concave surface of the counterbore 48 in the backing ring R. The compression member 56 may be bonded to the axial leg 60 of the rigidifying element 54 and may also be bonded to the radial flange 62. When the compression member 56 is not deflected, as it would be when the stabilizing ring S detached from the backing ring R, the greatest diameter of the stabilizing ring S measured at the convex outside face 70 of its compression member 56 should exceed the greatest diameter of the counterbore 48 in the backing ring R by between 0.0005 in. and 0.001 in. Alternatively, the greatest diameter of the stabilizing ring S should exceed the greatest diameter of the counterbore 48 by between 0.0005 in. and 0.022 in.

The stabilizing ring S, of course, does not find utility in an undeflected condition. Indeed, it resides (FIG. 2) in the counterbore 48 of the backing ring R and around the dust guard section 4 of the axle A in a state of compression. Owing to the interference fit between the axial leg 60 of the rigidifying element 54 and the dust guard section 4, the rigidifying element 54 acquires a slightly expanded configuration with the bow in its axial leg 60 somewhat diminished. The compression member 56, on the other hand, is compressed between the expanded axial leg 60 of the rigidifying element 54 and the concave surface of the counterbore 48.

Figure 2:
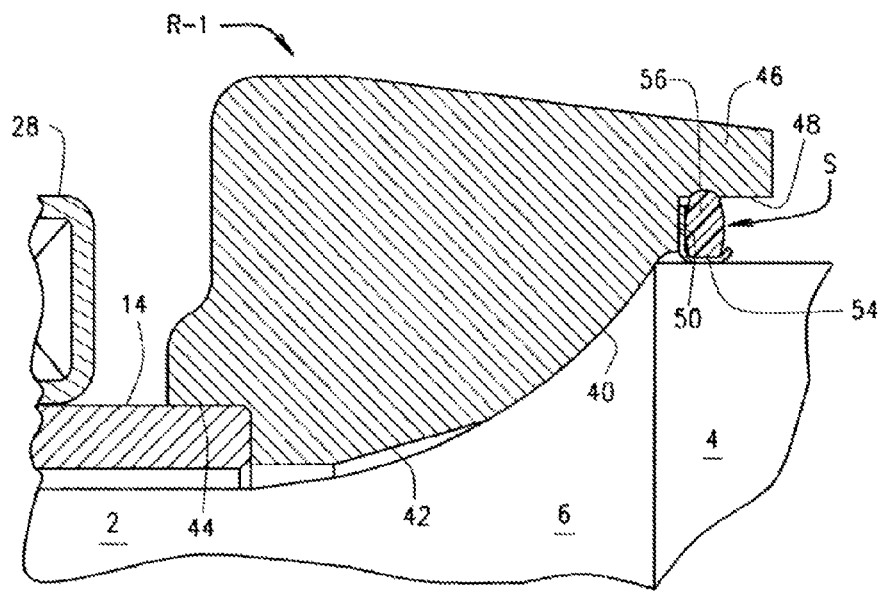
FIG. 2 is an enlarged sectional view of the backing ring and stabilizing ring.
Figure 6:
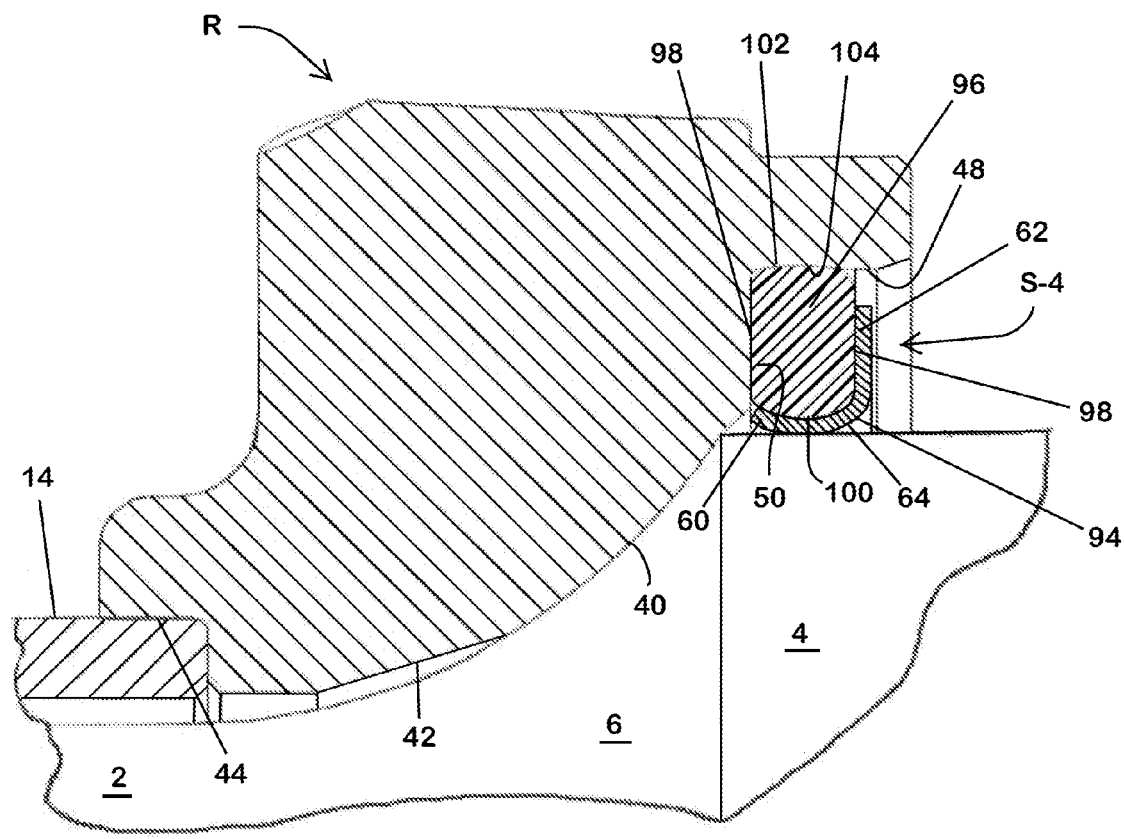
FIG. 6 is a sectional view showing another alternative stabilizing ring.

To install the backing ring R on the axle journal 2, the stabilizing ring S is first installed in the counterbore 48 of the backing ring R with the flange 62 of its rigidifying element 54 presented toward the shoulder 50 at the end of the counterbore 48 (FIG. 2). Alternatively, the compression member 56 may be presented toward the shoulder 50 (FIG. 6). During the installation the compression member 56 undergoes a radial contraction as it initially passes into the counterbore 48, but then expands slightly into the concave region of the counterbore 48 which it does as the radial flange 62 (or alternatively the compression member 56) approaches the shoulder 50. Once the stabilizing ring S is installed in the backing ring R, the backing ring R is advanced over the journal 2 with its lip 46 leading. Continued advancement brings the lip 46 of the backing ring R to the fillet 6 of the journal 2, and the fillet 6 serves to guide the stabilizing ring S and the lip 46 of the backing ring R onto the dust guard section 4. At this juncture force is exerted on the backing ring R, and that force transfers to the stabilizing ring S at the shoulder 50 of the backing ring R. Indeed, enough force is applied to drive the axial leg 60 of the rigidifying element 54 over the dust guard section 4, establishing an interference fit between the two. The compression member 56 remains in compression between the lip 46 of the backing ring R and the dust guard section 4. The bearing B, wear rings 14 and end cap 12 may be installed with the backing ring R, and finally the cap screws 16 are threaded into the holes 10 in the journal 2 and turned down against the end cap 12. This secures the backing ring R firmly against the fillet 6 with its arcuate inner surface 40 seated firmly against the surface of the fillet 6.

As the axle A rotates in the bearing B with a substantial radial load transferred through the bearing B to the axle A at the journal 2, the journal 2 will tend to flex in the region of the inboard wear ring 14 and the base of the fillet 6 and also at the interface between the inboard wear ring 14 and the back face 32 of the inboard cone 22. The flexure would be reflected to a large measure in the backing ring R were it not for the stabilizing ring S. Being interposed between the lip 46 of the backing ring R and the dust guard section 4 of the axle A with its compression member 56 in a state of compression, the stabilizing ring S couples the backing ring R firmly in a radial direction to the dust guard section 4. Hence, the arcuate inner surface 40 of the backing ring R has reduced fretting motion against the surface of the fillet 6. The compression member 56, while suppressing radial movement at the backing ring R, allows microaxial movement, this owing to the somewhat flexible character of the material from which the compression member 56 is formed. The microaxial movement, in turn, reduces fretting movement at the interface between the end of the inboard wear ring 14 and the back face 32 of the inboard cone 22. The managed microaxial movement as the clamping force on the bearing B relaxes during use ensures less fretting wear at the interface between the inboard wear ring 14 and the back face 32 of the inboard cone 22—an interface that represents a high wear area with traditional backing rings in the presence of heavy axle loads.

More particularly, a journal provided with a standard (conventional) backing ring, when subjected to a heavy cyclical load, will flex such that microscopic clearances will develop between the back face of the inboard cone and the end of the inboard seal wear ring along the upper region of the journal. Likewise, more clearances will develop at the interface between the journal fillet radius and the backing ring inner radius where the backing ring fillet merges into the dust guard section, again along the upper region of the journal. A fitted backing ring performs slightly differently. Owing to the tight fit at the dust guard section, the microscopic movement for a fitted wear ring is confined almost entirely to the back face of the inboard cone and the abutting end of the inboard wear ring. With either a standard or fitted backing ring, the microscopic clearances over time produce fretting and wear which is most pronounced at the back face of the inboard cone and the abutting end of the inboard seal wear ring. The stabilizing ring S, with its compression member 56 being in a state of compression, but still being axially flexible due to material selection and shape, allows microaxial movement of the backing ring R that reduces the cyclic separations between the wear ring 14, and the back face 32 of the inboard cone 22. As a consequence, less fretting and wear occurs between the back face 32 of the inboard cone 22 and the inboard wear ring 14 while still allowing a seal to exclude water and retain the backing ring in a torsional and radial direction.

An alternative stabilizing ring S-2 utilizes the same rigidifying element 54, but has a compression member 74 of generally rectangular cross section. To this end, the compression member 74 has generally planar and parallel side faces 76 and a convex inside face 78 and likewise a convex outside face 80.

Another alternative stabilizing ring S-3 again utilizes the same rigidifying element 54, but has a compression member 84 that possesses a generally X-shaped or hourglass cross section. As such, the compression member 84 has concave side faces 86 in addition to a convex inside face 88 and a convex outside face 90.

Another alternative stabilizing ring S-4 is shown in FIG. 6 and utilizes a J-shaped rigidifying element 94 and uses a compression member 96 that possesses a generally rectangular cross section. The compression member 96 has generally planar and parallel side faces 98 and a convex inside face 100 and a likewise convex outside face 102. In other embodiments, any combination of the rigidifying elements 54, 94 and the compression members 56, 74, 84, 96 may be used. As an example, the stabilizing ring S-4 may alternatively use one of the compression members 74 and 84 having convex or concave side faces, respectively. The compression member 96 is located between the flange 62 and the shoulder 50 of the counterbore 48. The convex outside face 102 of the compression member 96 generally engages a concave surface or region 104 of the counterbore 48, and one of the side faces 98 of the compression member 96 generally engages the shoulder 50 of the counterbore 48. The orientation of the J-shaped rigidifying element 94 is such that the axially directed leg 60 extends from the corner 64 toward the shoulder 50 presented at the end of the counterbore 48. In the current embodiment, the axially directed leg 60 is generally arcuate in shape, while in other embodiments the axially directed leg 60 may be flatter.

Figure 7:
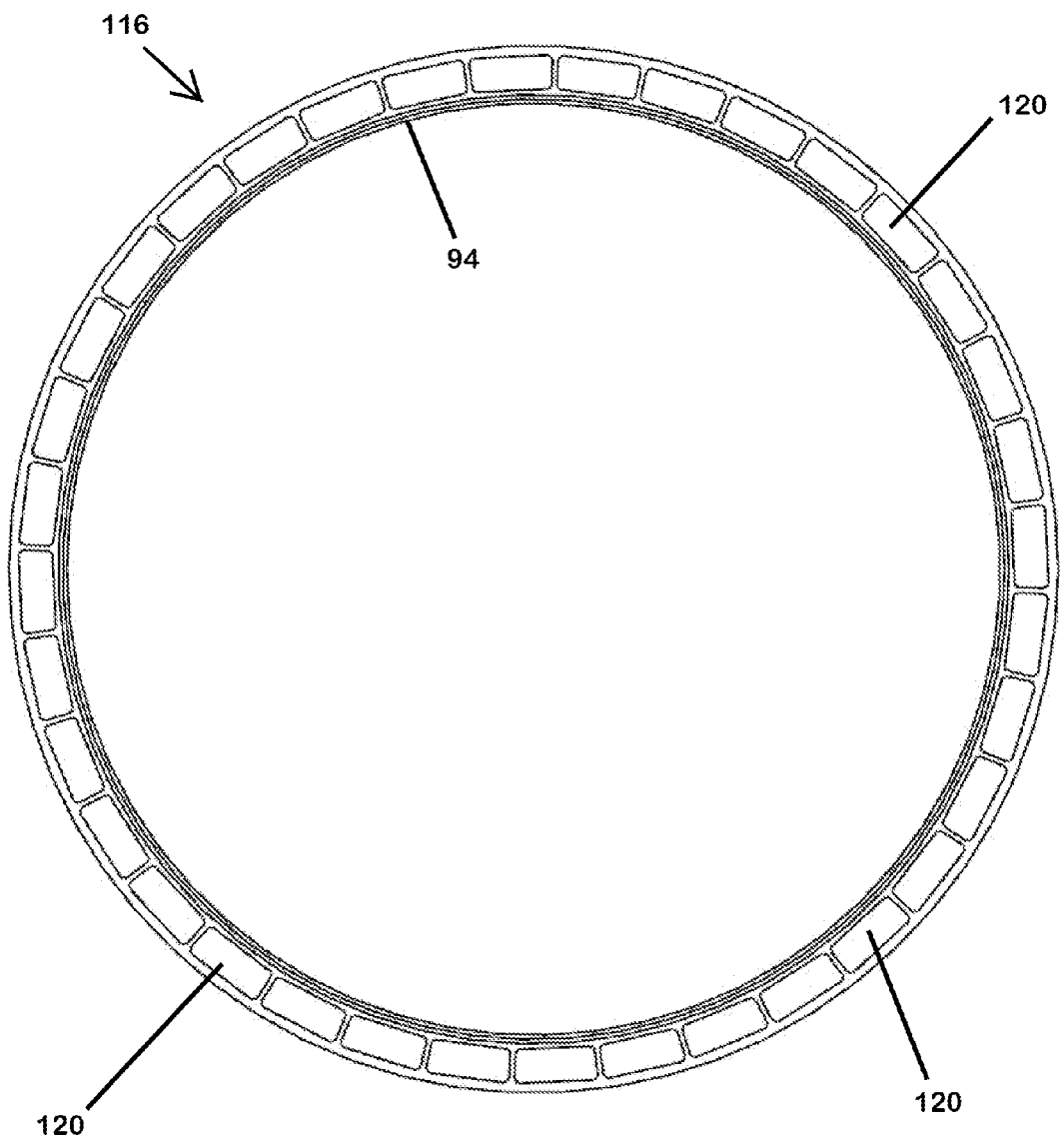
FIG. 7 is an end view of a compression member positioned on a rigidifying element.
Figures 8, 9:
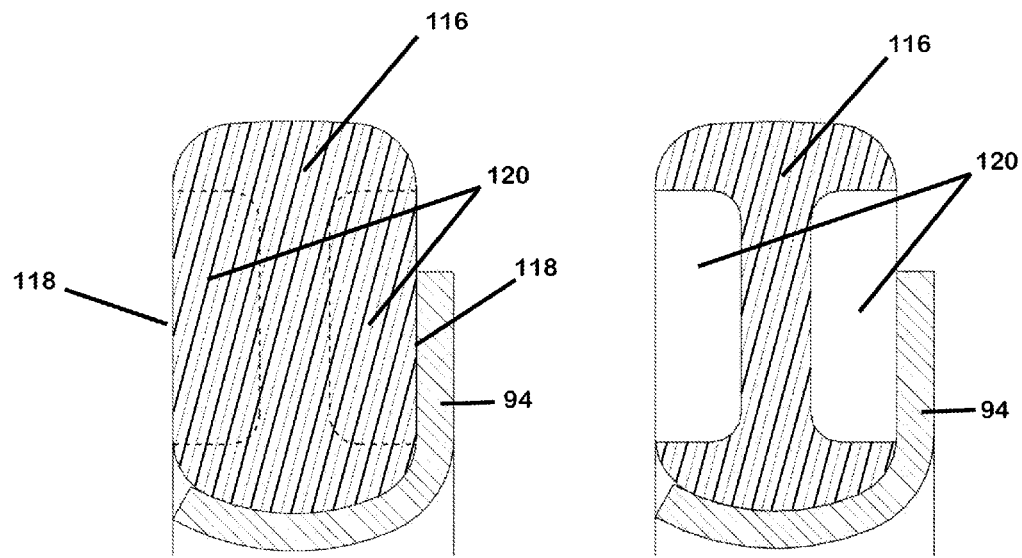
FIG. 8 is a sectional view of the compression member of FIG. 7 positioned on a rigidifying element.
FIG. 9 is another sectional view of the compression member of FIG. 7 positioned on a rigidifying element.
Figures 10, 11:
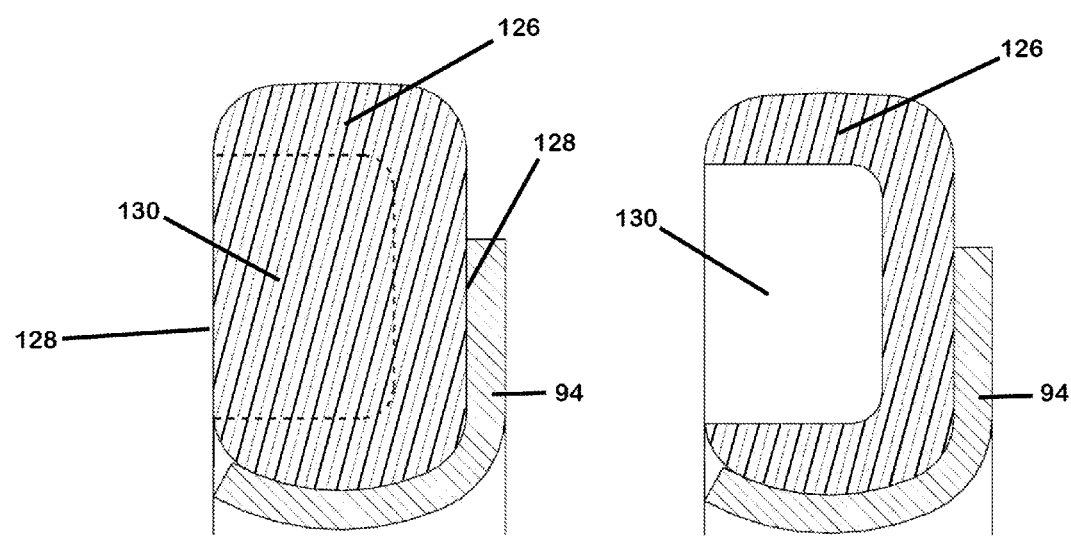
FIG. 10 is a sectional view of another compression member positioned on a rigidifying element.
FIG. 11 is another sectional view of the compression member of FIG. 10 positioned on a rigidifying element.

FIGS. 7-9 illustrate another compression member 116 that includes a plurality of cavities 120 located within both side faces 118. FIGS. 10 and 11 illustrate a similar compression member 126 that includes a plurality of cavities 130 located within a single side face 128. Both of the compression members 116, 126 may be used with any one of the rigidifying elements 54, 94 previously described. The cavities 120, 130 may also be provided in different quantities, shapes, or sizes within the compression members 116, 126. The cavities 120, 130 are provided to reduce the volume and mass of the compression members 116, 126 to improve manufacturability while still maintaining the required stiffness.

While the primary utility for the stabilizing rings S resides in the rigidifying and stabilizing a backing ring R at the fillet 6 on the journal 2 of a rail car axle A, they may be utilized at the fillets on the journals of other types of shafts not necessarily associated with railroads. Moreover, the journal 2 and bearing B may be of the compact variety in which the end of the backing ring abuts the back face of the inboard cone and the end cap abuts the back face of the outboard cone, that is to say, a bearing arrangement such as disclosed in U.S. Pat. No. 5,462,367 which does not rely on wear rings. That patent is incorporated herein by reference. Moreover, the bearing need not be a tapered roller bearing, but may be some other type of antifriction bearing, such as an angular contact ball bearing, a spherical roller bearing, or a cylindrical roller bearing.

Various features and advantages of the invention are set forth in the following claims.

What is claimed is:

1. In combination with a shaft having a journal to which a bearing is fitted and an enlarged section with a fillet leading from the journal to the enlarged section; the combination comprising:
   a backing ring located around the fillet and having a counterbore that receives an end of the enlarged section adjacent to the fillet; and
   a stabilizing ring for reducing movement between the backing ring and the fillet, the stabilizing ring including:
      a rigidifying element located around the enlarged section of the shaft and having an axially directed leg that fits over the enlarged section with an interference fit and a radially directed flange; and
      a compression member engaging the rigidifying element and a surface of the counterbore in the backing ring, the compression member being in a state of compression between the surface of the counterbore in the backing ring and the rigidifying element, the compression member being formed from a material that is more flexible than the material from which the rigidifying element is formed;
   wherein the backing ring has a shoulder at an end of the counterbore, and the compression member is located between the flange and the shoulder of the counterbore.

2. The combination according to claim 1, wherein the rigidifying element is located in the counterbore of the backing ring.

3. The combination according to claim 1, wherein the rigidifying element is located between the compression member and the enlarged section of the shaft.

4. The combination according to claim 1, wherein the counterbore has a concave surface that is presented toward and surrounds the enlarged section of the shaft, and the compression member bears against the concave surface.

5. The combination according to claim 1, wherein the compression member has side surfaces that are convex.

6. The combination according to claim 1, wherein the compression member has side surfaces that are generally planar and parallel.

7. The combination according to claim 1, wherein the compression member has side surfaces that are concave.

8. The combination according to claim 1, wherein the axially directed leg generally extends from a corner of the rigidifying element toward the shoulder of the backing ring.

9. The combination according to claim 1, wherein the axially directed leg is arcuate.

10. The combination according to claim 1, wherein the compression member has at least one side surface provided with at least one cavity therein.

11. In combination with an axle that defines an axis and has a journal and an enlarged section aligned with the journal and a fillet at which the journal leads up to the enlarged section and with a bearing including an inner race that fits over the journal and has a back face that is presented toward the fillet; the combination comprising:
a backing ring that fits over the journal between the fillet and the inner race of the bearing, the backing ring being against the fillet and having a lip that projects over the enlarged section and contains a counterbore that receives the enlarged section; and
a stabilizing ring located within the counterbore of the backing ring between the lip of the backing ring and the enlarged section of the axle, the stabilizing ring comprising:
a rigidifying element formed from a generally rigid material and having an axially directed leg fitted with an interference fit around the enlarged section of the axle and a radially directed flange, the rigidifying element positioned within the counterbore of the backing ring;
an annular compression member engaging the rigidifying element and a surface of the counterbore in the backing ring, the compression member compressed between the lip of the backing ring and the axially directed leg of the rigidifying element, the compression member being formed from a material having a modulus of elasticity that is less than the modulus of elasticity for the material from which the rigidifying element is formed;
wherein the backing ring has a shoulder at an end of the counterbore, and the axially directed leg generally extends from a corner of the rigidifying element toward the shoulder of the backing ring.

12. The combination according to claim 11, wherein the compression member is formed from a polymer.

13. The combination according to claim 11, wherein the compression member of the stabilizing ring allows microaxial movement of the backing ring to reduce wear on the back face of the inner race.

14. The combination according to claim 11, wherein the compression member is located between the flange and the shoulder of the backing ring.

15. The combination according to claim 11, wherein the axially directed leg is arcuate.

16. The combination according to claim 11, wherein the compression member has at least one side surface provided with at least one cavity therein.

17. In combination with a shaft having a journal to which a bearing is fitted and an enlarged section with a fillet leading from the journal to the enlarged section; the combination comprising:
a backing ring located around the fillet and having a counterbore that receives an end of the enlarged section adjacent to the fillet; and
a stabilizing ring for reducing movement between the backing ring and the fillet, the stabilizing ring including:
a rigidifying element located around the enlarged section of the shaft and having an axially directed leg that fits over the enlarged section with an interference fit and a radially directed flange; and
a compression member engaging the rigidifying element and a surface of the counterbore in the backing ring and being in a state of compression between the surface and the rigidifying element, the compression member being formed from a material that is more flexible than the material from which the rigidifying element is formed;
wherein the counterbore has a concave surface that is presented toward and surrounds the enlarged section of the shaft and a shoulder located at an end of the counterbore, and the compression member bears against the concave surface and the shoulder.

18. The combination according to claim 17, wherein the compression member is located between the radial directed flange and the shoulder.

19. The combination according to claim 17, wherein the rigidifying element is located between the compression member and the enlarged section of the shaft.

20. The combination according to claim 17, wherein the axially directed leg generally extends from a corner of the rigidifying element toward the shoulder.

21. The combination according to claim 17, wherein the axially directed leg is arcuate.

22. The combination according to claim 17, wherein the compression member has at least one side surface provided with at least one cavity therein.

* * * * *